United States Patent
Zhong et al.

(10) Patent No.: US 12,169,446 B2
(45) Date of Patent: Dec. 17, 2024

(54) METHOD, DETECTION CIRCUIT AND ELECTRONIC DEVICE FOR DETECTING TIMING SEQUENCE OF SERIALIZER

(71) Applicant: Beijing ESWIN Computing Technology Co., Ltd., Beijing (CN)

(72) Inventors: Long Zhong, Beijing (CN); Jangjin Nam, Beijing (CN); Dongsoo Park, Beijing (CN)

(73) Assignee: BEIJING ESWIN COMPUTING TECHNOLOGY CO., LTD., Beijing (CN)

( * ) Notice: Subject to any disclaimer, the term of this patent is extended or adjusted under 35 U.S.C. 154(b) by 41 days.

(21) Appl. No.: 18/089,803

(22) Filed: Dec. 28, 2022

(65) Prior Publication Data
US 2023/0244580 A1   Aug. 3, 2023

(30) Foreign Application Priority Data

Jan. 29, 2022  (CN) .......................... 202210112692.3

(51) Int. Cl.
*G06F 11/22*   (2006.01)
(52) U.S. Cl.
CPC ...... *G06F 11/2221* (2013.01); *G06F 11/2273* (2013.01)
(58) Field of Classification Search
CPC ............. G06F 11/2221; G06F 11/2273; G06F 11/2215
See application file for complete search history.

(56) References Cited

U.S. PATENT DOCUMENTS

| | | | | |
|---|---|---|---|---|
| 7,468,685 | B1* | 12/2008 | Macaluso | H03M 9/00 341/101 |
| 8,315,303 | B1* | 11/2012 | Chana | H04L 25/4902 375/296 |
| 2004/0065904 | A1* | 4/2004 | Yoshida | G11C 7/02 257/200 |

(Continued)

OTHER PUBLICATIONS

R. Giordano and A. Aloisio, "Fixed-Latency, Multi-Gigabit Serial Links With Xilinx FPGAs," in IEEE Transactions on Nuclear Science, vol. 58, No. 1, pp. 194-201, Feb. 2011, doi: 10.1109/TNS.2010.2101083. (Year: 2011).*

(Continued)

*Primary Examiner* — Daniel F. McMahon
(74) *Attorney, Agent, or Firm* — Scully, Scott, Murphy & Presser, P.C.

(57) ABSTRACT

A method, a detection circuit and an electronic device for detecting timing sequence of serializer are provided. The method for detecting a timing sequence of a serializer includes: sampling serial data to obtain first sampled serial data and second sampled serial data, wherein the serial data is obtained by parallel-serial conversion of parallel data used for detection by the serializer, and the first sampled serial data and the second sampled serial data respectively include values corresponding to different data bits of the serial data; performing logical operation between on the first sampled serial data and the second sampled serial data to obtain a first result signal; and performing timing sequence detection on the first result signal, wherein the timing sequence detection is used for detecting whether the timing sequence correctness of the serializer is correct.

15 Claims, 4 Drawing Sheets

(56) References Cited

U.S. PATENT DOCUMENTS

| | | | |
|---|---|---|---|
| 2012/0044984 A1* | 2/2012 | Zerbe | H04L 25/03343 375/233 |
| 2012/0072759 A1* | 3/2012 | Wu | H03M 9/00 713/401 |

OTHER PUBLICATIONS

A. Kumar, S. Mehta, S. Paul, H. S. Gupta and R. M. Parmar, "Indigenous development of SERDES interface for miniaturization," 2012 1st International Conference on Emerging Technology Trends in Electronics, Communication & Networking, Surat, India, 2012, pp. 1-6, doi: 10.1109/ET2ECN.2012.6470106. (Year: 2012).*

\* cited by examiner

METHOD, DETECTION CIRCUIT AND ELECTRONIC DEVICE FOR DETECTING TIMING SEQUENCE OF SERIALIZER

CROSS-REFERENCE TO RELATED APPLICATIONS

Under the applicable patent law and/or rules pursuant to the Paris Convention, this application is made to timely claim the priority to and benefits of China Patent Application No. 202210112692.3, filed on Jan. 29, 2022. For all purposes under the law, the entire disclosure of the aforementioned application is incorporated by reference as part of the disclosure of this application.

TECHNICAL FIELD

Embodiments of the present disclosure relate to a method, a detection circuit and an electronic device for detecting a timing sequence of a serializer.

BACKGROUND

Serializer (SER) has the function of converting parallel data into serial data. For example, a high-speed serializer can convert low-speed parallel data into high-speed serial data, thus realizing the parallel-serial high-speed conversion of data. In order to ensure the correct parallel-serial conversion function of the serializer, it is necessary to check timing sequence correctness of the serializer.

The traditional high-speed serializer's timing sequence function mostly adopts an external Loopback Test detection. This detection method requires an additional receiving circuit to decode received high-speed low-voltage analog differential signals (for example, converted from the serial data output by the serializer by the driver) and then compare them with original transmit data. According to a result of the comparison, it can be judged whether the timing sequence function of the serializer is correct or not. This detection method is based on an existing on-chip or off-chip receiver and requires corresponding software control, so a hardware structure is complicated and the design cost is high.

SUMMARY

The first aspect of the present disclosure provides a method for detecting a timing sequence of a serializer, including: sampling serial data to obtain first sampled serial data and second sampled serial data, wherein the serial data is obtained by parallel-serial conversion of parallel data used for detection by the serializer, and the first sampled serial data and the second sampled serial data respectively include values corresponding to different data bits of the serial data; performing logical operation on the first sampled serial data and the second sampled serial data to obtain a first result signal; and performing timing sequence detection on the first result signal, wherein the timing sequence detection is used for detecting the timing sequence correctness of the serializer.

For example, according to the method provided in the first aspect of the present disclosure, performing the timing sequence detection on the first result signal includes: performing level detection on the first result signal; or performing edge detection on the first result signal.

For example, according to the method provided in the first aspect of the present disclosure, performing the timing sequence detection on the first result signal includes: performing level detection on the first result signal to obtain a second result signal; and performing edge detection on the second result signal.

For example, according to the method provided in the first aspect of the present disclosure, performing the edge detection on the second result signal further includes: counting pulses in the second result signal, and performing the edge detection on overflow bits of the counted value when the counted value exceeds a threshold value.

For example, according to the method provided in the first aspect of the present disclosure, performing the level detection on the first result signal includes inputting the first result signal into a data input terminal of a first D flip-flop; and performing the edge detection on the second result signal includes inputting the second result signal to a clock control terminal of a second D flip-flop.

For example, according to the method provided in the first aspect of the present disclosure, the parallel data used for detection has data bits of 0 and 1.

For example, according to the method provided in the first aspect of the present disclosure, the parallel data used for detection has data bits with alternating 0 and 1.

For example, according to the method provided in the first aspect of the present disclosure, sampling the serial data includes: sampling serial data by two-phase clocks with opposite phases such that the first sampled serial data includes values corresponding to odd data bits of the serial data, and the second sampled serial data includes values corresponding to even data bits of the serial data.

A second aspect of the present disclosure provides a detection circuit for detecting a timing sequence of a serializer, including: a sampling circuit, configured to sample serial data to obtain first sampled serial data and second sampled serial data, wherein the serial data is obtained by parallel-serial conversion of parallel data used for detection by the serializer, and the first sampled serial data and the second sampled serial data respectively include values corresponding to different data bits of the serial data; a logical operation circuit, configured to perform logical operation on the first sampled serial data and the second sampled serial data to obtain a first result signal; and a timing sequence detection circuit, configured to perform timing sequence detection on the first result signal, wherein the timing sequence detection is used for determining timing sequence correctness of the serializer.

For example, according to the detection circuit provided in the second aspect of the present disclosure, the timing sequence detection circuit includes: a level detection circuit, configured to perform level detection on the first result signal; or an edge detection circuit, configured to perform edge detection on the first result signal.

For example, according to the detection circuit provided in the second aspect of the present disclosure, the timing sequence detection circuit includes: a level detection circuit, configured to perform level detection on the first result signal to obtain a second result signal; and an edge detection circuit, configured to perform edge detection on the second result signal.

For example, according to the detection circuit provided in the second aspect of the present disclosure, the edge detection circuit includes: a counter, configured to count pulses in the second result signal, and perform edge detection on overflow bits of the counted value when the counted value exceeds a threshold value.

For example, according to the detection circuit provided in the second aspect of the present disclosure, the level detection circuit includes a first D flip-flop, and the first result signal is input to a data input terminal of the first D flip-flop; and the edge detection circuit includes a second D flip-flop, and the second result signal is input to a clock control terminal of the second D flip-flop.

For example, according to the detection circuit provided in the second aspect of the present disclosure, the parallel data used for detection has data bits of 0 and 1.

For example, according to the detection circuit provided in the second aspect of the present disclosure, the parallel data used for detection has data bits with alternating 0 and 1.

For example, according to the detection circuit provided in the second aspect of the present disclosure, the sampling circuit is configured to sample the serial data by two-phase clocks with opposite phases such that the first sampled serial data includes values corresponding to odd data bits of the serial data, and the second sampled serial data includes values corresponding to even data bits of the serial data.

A third aspect of the present disclosure provides an electronic device including the detection circuit for detecting the timing sequence of the serializer and the serializer as described above.

At least one embodiment of the disclosed method or detection circuit for detecting the sequence of the serializer can directly detect the serial data output by the serializer (for example, it may be implemented as a Built-in Self-Test (BIST) circuit) based on the parallel data used for detection, without detecting the data passing through the driver, thus avoiding the use of additional on-chip or off-chip receivers and corresponding software, thereby reducing the complexity of the hardware structure and the design cost.

BRIEF DESCRIPTION OF THE DRAWINGS

In order to more clearly explain the technical scheme of the embodiments of the present disclosure, the drawings of the embodiments of the present disclosure will be briefly introduced below. Obviously, the drawings in the following description only relate to some embodiments of the present disclosure, rather than limiting the present disclosure.

DETAILED DESCRIPTION

Reference will now be made in detail to specific embodiments of the present disclosure, examples of which are illustrated in the accompanying drawings. Although the present disclosure will be described in conjunction with specific embodiments, it will be understood that it is not intended to limit the present disclosure to the described embodiments. Instead, it is intended to cover changes, modifications and equivalents included within the spirit and scope of the present disclosure as defined by the appended claims. It should be noted that the method operations described herein may be implemented by any functional block or functional arrangement, and any functional block or functional arrangement may be implemented as a physical entity or a logical entity, or a combination of both.

In order to enable those skilled in the art to better understand the present disclosure, the present disclosure will be explained in further detail below with reference to the drawings and detailed description.

Note that the examples to be introduced next are only specific examples, and not a limitation that the embodiments of the present disclosure must be specific shapes, hardware, connection relationships, operations, values, conditions, data, sequences, etc. shown and described. Those skilled in the art can use the concept of this disclosure to construct more embodiments not mentioned in this specification by reading this specification.

The terms used in this disclosure are those general terms that are widely used in the field at present in consideration of the functions related to this disclosure, but these terms may be changed according to the intention of those of ordinary skill in this field, precedents or new technologies in this field. In addition, specific terms may be selected by the applicant, and in this case, their detailed meanings will be described in the detailed description of this disclosure. Therefore, the terms used in the specification should not be understood as simple names, but as general descriptions based on the meanings of the terms and this disclosure.

Flowcharts are used in this disclosure to illustrate the operations involved according to the embodiments of the present application. It should be understood that the preceding or following operations are not necessarily performed exactly in order. Instead, various steps may be processed in reverse order or simultaneously, as required. At the same time, one or more additional operations can be added to these procedures, or a step or steps can be removed from these procedures.

Serializer (SER) has the function of converting parallel data into serial data. For example, a high-speed serializer can convert parallel low-speed data into serial high-speed data.

Figure 1:
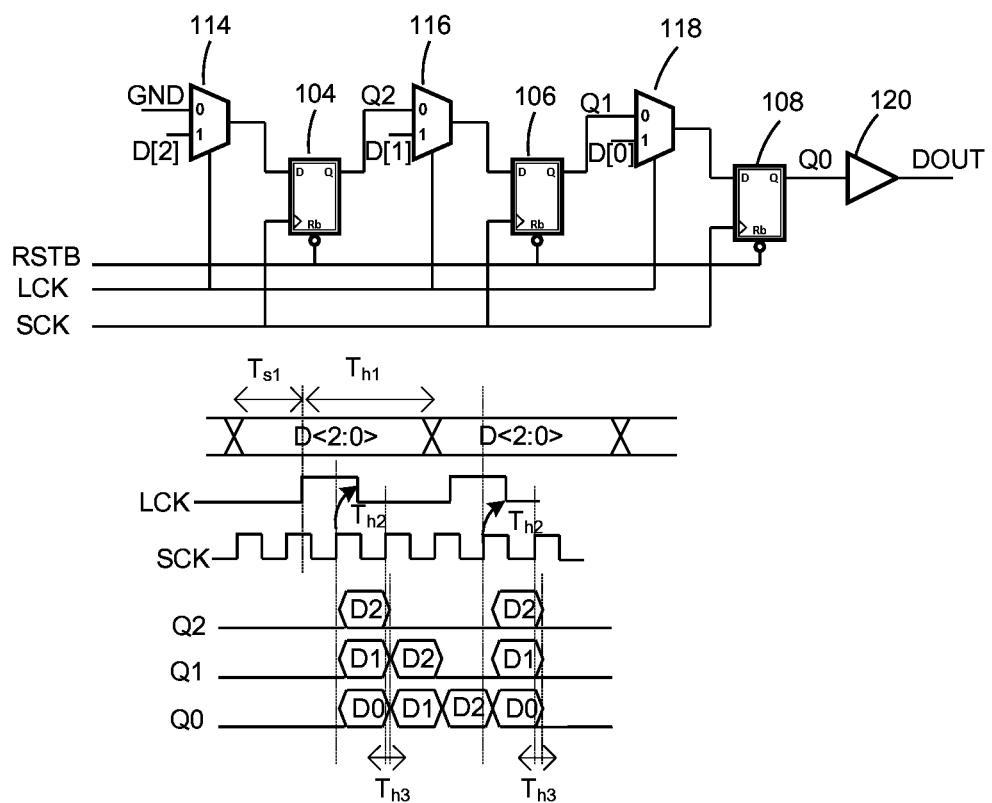
FIG. 1 illustrates a schematic diagram and timing sequence control diagram of a serializer according to at least one embodiment of the present disclosure.

FIG. 1 illustrates a schematic diagram and timing sequence control diagram of a serializer according to at least one embodiment of the present disclosure. The serializer shown in FIG. 1 is a serializer of 3-to-1 shift register type, i.e., it can convert 3 channels of parallel data into 1 channel of serial data. It can be understood that the serializer in FIG. 1 is only an example, and the serializer may also have other structures, and may realize parallel-serial conversion from n to 1, where n is a positive integer greater than 1.

Referring to FIG. 1, the serializer includes three flip-flops (shown as D flip-flops 104 to 108) and three one-of-two data selectors (shown as one-of-two data selectors 114 to 118). In addition, the serializer also needs to receive external control timing sequence, i.e., a download data clock (LCK) and a shift trigger clock control (SCK).

When LCK is high, 3 bits of parallel data are downloaded to a data terminal (D) of each flip-flop, respectively, and then a synchronous high-speed clock SCK triggers each flip-flop from low to high, and outputs high-speed bit streams successively. Wherein the lower bit D0 comes first, the upper bit D2 comes last, and finally, the conversion from 3-bit parallel data to serial data is realized in one download cycle. Similarly, the next LCK cycle can continue to convert the latter piece of data. As shown in FIG. 1, the serial data can be output through a digital buffer 120.

The key of timing sequence lies in a timing sequence relationship between a synchronous clock and data of flip-flops, among which the main timing sequence relationships include establishment time ($T_{s1}$) and holding time ($T_{h1}$) of LCK and parallel data; holding time between SCK and LCK ($T_{h2}$); synchronous D flip-flop holding time ($T_{h3}$). Usually, $T_{s1}/T_{h1}$ are more relaxed, for example, it may be 100 Mbps~4 ns or other time lengths, and for example, it is used for allowing input of parallel data. In contrast, $T_{h2}$ and $T_{h3}$ are more critical, generally at the level of ~100ps. When time margins of $T_{h2}$ and $T_{h3}$ are not enough, the data may be sampled by mistake, resulting in errors in the output serial data. Therefore, it is particularly important to check the timing sequence correctness of the serializer (also called timing sequence function).

The timing sequence function of traditional high-speed serializers is mostly detected by external Loopback. This detection method requires an additional receiving circuit to decode received high-speed low-voltage analog differential signals (for example, converted from the serial data output by the serializer by the driver) and then compare them with the original transmit data. According to a result of the comparison, it can be judged whether the timing sequence function of the serializer is correct or not. This detection method is based on existing on-chip or off-chip receivers and requires corresponding software control, so the hardware structure is complicated and the design cost is high.

At least one embodiment of the present disclosure provides a method, a detection circuit, and an electronic device for detecting the timing sequence of a serializer, which reduces the complexity of hardware for detecting the timing sequence correctness of the serializer and reduces the design cost.

With reference to the following drawings, the method, the detection circuit and the electronic device for detecting the timing sequence of the serializer according to the embodiment of the present disclosure will be described in detail.

First, the following describes the method of detecting the timing sequence of the serializer according to the embodiment of the present disclosure. The method of detecting the timing sequence of the serializer can be applied to the detection circuit, electronic device, as described further below, other suitable software or hardware, or the combination of hardware and software.

Figure 2:
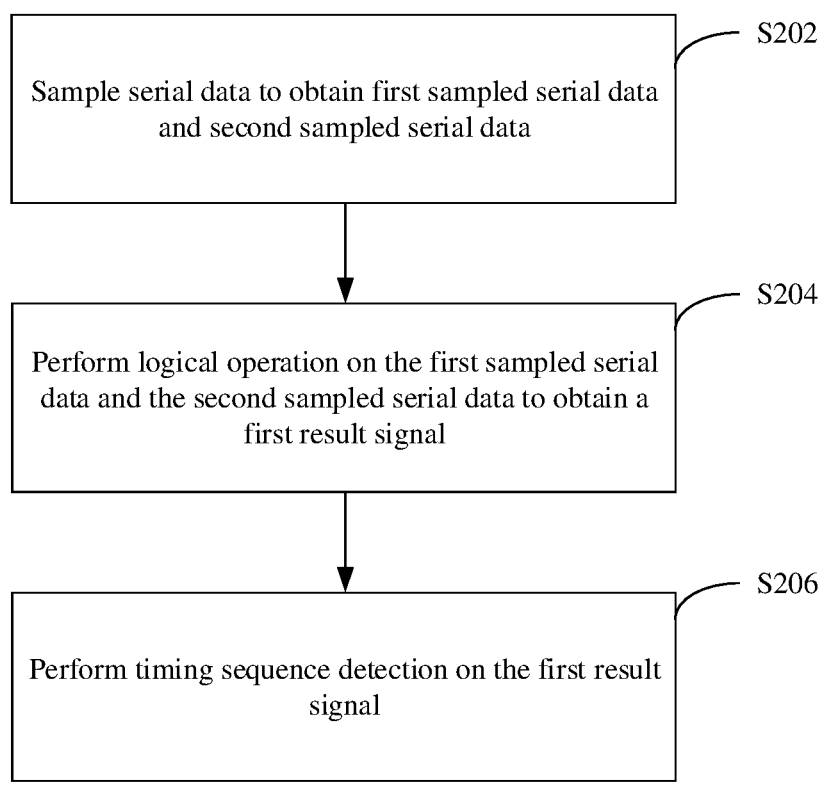
FIG. 2 illustrates a flowchart of a method of detecting the timing sequence of a serializer according to at least one embodiment of the present disclosure.

FIG. 2 illustrates a flowchart of a method of detecting the timing sequence of a serializer according to at least one embodiment of the present disclosure. The method for detecting the timing sequence of the serializer of this embodiment may include steps S202 to S206.

At step S202, the serial data is sampled to obtain first sampled serial data and second sampled serial data, wherein the serial data is obtained by parallel-serial conversion of the parallel data used for detection by the serializer, and the first sampled serial data and the second sampled serial data respectively include values corresponding to different data bits of the serial data.

In the embodiment of the present disclosure, the parallel data input to the serializer is the parallel data used for detection. For example, the parallel data used for detection may be, for example, parallel data predicted or predetermined according to the detection purpose, so when the timing sequence of the serializer is correct (also called normal timing sequence function), the serial data output by the serializer can be predicted or predetermined, or the serial data output by the serializer corresponds to the parallel data used for detection. In addition, when the timing sequence of the serializer is wrong (also called abnormal timing sequence function), for example, setup time margin and holding time margin required for reading parallel data by the serializer are not suitable (for example, these time margins are not enough), the serial data output by the serializer will not correspond to the parallel data used for detection. Therefore, by comparing the serial data actually output by the serializer with the ideal serial data, the timing sequence correctness of the serializer can be confirmed.

In the embodiment of the present disclosure, in order to characterize the timing sequence correctness of the serializer, it is necessary to sample serial data to obtain a plurality of sampled serial data respectively including values corresponding to different data bits of the serial data. In other words, the first sampled serial data includes values of a first type of data bits, and the second sampled serial data includes values of a second type of data bits, wherein the first type of data bits and the second type of data bits are different. In some embodiments, the first sampled serial data may include values of odd data bits of serial data, and the second sampled serial data may include values of even data bits of serial data. In this way, data on all data bits of serial data can be obtained. For example, the first sampled serial data and the second sampled serial data can be obtained by sampling the serial data output by the serializer by two-phase clocks (e.g., CK0/CK180, CK180/CK360, etc.) generated by an on-chip phase-locked loop (PLL), respectively. In yet other embodiments, the serial data may be sampled sparsely, i.e., it is not necessary to sample a value of each data bit of the serial data. For example, two-phase clocks can be generated by a frequency multiplier and a frequency divider, and then the serial data output by the serializer can be sampled based on the two-phase clocks.

In this way, the first sampled serial data and the second sampled serial data can characterize the timing sequence correctness of the serializer, or the timing sequence correctness of the serializer can be embodied in the first sampled serial data and the second sampled serial data. For example, when the timing sequence of the serializer is correct, the first sampled serial data will correspond to the corresponding parallel data among the parallel data used for detection, and the second sampled serial data will correspond to the corresponding parallel data among the parallel data used for detection. For example, when the timing sequence of the serializer is wrong, at least one of the first sampled serial data and the second sampled serial data will not correspond to the corresponding parallel data among the parallel data used for detection.

In an exemplary example, the parallel data used for detection may be, for example, 10 parallel data (for example, from 10 paths respectively), which are 0101010101 respectively. The parallel data used for detection can be output as serial data 0101010101 after parallel-serial processing by the serializer. The serial data 0101010101 output by the serializer can be sampled by the two-phase clocks CK0/CK180, respectively, so as to obtain the first sampled serial data 00000 and the second sampled serial data 11111. In this example, when the timing sequence of the serializer is correct, the first sampled serial data 00000 will correspond to the odd parallel data (all 0) among the parallel data used for detection, and the second sampled serial data 11111 will correspond to the even parallel data (all 1) among the parallel data used for detection.

In addition, when the timing sequence of the serializer is wrong, the serial data output by the serializer will no longer be 0101010101, so the first sampled serial data will not be all 0s, i.e., the first sampled serial data does not correspond to the odd data (all 0s) among the parallel data used for detection; or the second sampled serial data will not be all 1s, i.e., the second sampled serial data does not correspond to the even parallel data (all 1s) among the parallel data used for detection; or the first sampled serial data will not be all 0s and the second sampled serial data will not be all 1s, i.e., the first sampled serial data does not correspond to the odd parallel data (all 0s) and the second sampled serial data does not correspond to the even parallel data (all 1s).

The parallel data used for detection in the above example is only exemplary, and the exemplary parallel data used for detection may also be all-0s parallel data, all-1s parallel data or other forms of parallel data. In addition, the sampling of serial data in the above example is only exemplary, and the serial data may be sampled in other ways.

In this way, the timing sequence correctness of the serializer will be reflected in the sampled serial data, so the timing sequence correctness of the serializer can be judged based on the first sampled serial data and the second sampled serial data.

At step S204, logical operation is performed on the first sampled serial data and the second sampled serial data to obtain a first result signal.

After the first sampled serial data and the second sampled serial data are acquired, the first sampled serial data and the second sampled serial data can be simplified into a first result signal in the form of a timing sequence data by performing logical operation on the first sampled serial data and the second sampled serial data, and the timing sequence data contains information of the first sampled serial data and the second sampled serial data, thus containing information that can characterize the timing sequence correctness of the serializer.

For example, continuing the above example, logical operation such as XNOR can be performed on the first sampled serial data 00000 and the second sampled serial data 11111, so that the timing sequence data of 00000, i.e., the first result signal, can be obtained. Of course, other logical operations may also be performed on the serial data, such as exclusive or (XOR) logical operations.

At step S206, timing sequence detection is performed on the first result signal, wherein the timing sequence detection is used for detecting the timing sequence correctness of the serializer.

As mentioned above, the first result signal is embodied in the form of one timing sequence data, and contains information that can characterize the timing sequence correctness of the serializer. Therefore, timing sequence detection can be performed on the first result signal. And the timing sequence correctness (correct/wrong) of the serializer is detected based on the timing sequence detection.

In some embodiments, at step S206, the timing sequence detection is performed on the first result signal, wherein the timing sequence detection is used for detecting the timing sequence correctness of the serializer, and the first result signal is a stable horizontal signal when the timing sequence of the serializer is correct.

For example, continuing the above example, when it is detected that the timing sequence data of the first result signal is 00000 (i.e., a stable low-level signal), i.e., when it is detected that the timing sequence of the first result signal is all 0s, it can be determined that the timing sequence of the serializer is correct. In addition, when the timing sequence data of which the first result signal is not 00000 is detected, for example, when the first result signal may include one or more high levels of 1s, it can be determined that the timing sequence of the serializer is incorrect. Therefore, timing sequence detection can be used for detecting the timing sequence correctness of the serializer.

For example, if the logical operation in the above example is modified from XNOR to XOR, it can be determined that the timing sequence of the serializer is correct when it is detected that the timing sequence data of the first result signal is 11111 (i.e., a stable high-level signal). For another example, if the parallel data used for detection in the above example is set to all 0s or all 1s, it can also be determined that the timing sequence of the serializer is correct when it is detected that the timing sequence data of the first result signal is 11111 (i.e. a stable high-level signal). Other suitable parallel data, serial data sampling and/or logical operations may also be set, so that the first result signal is a stable horizontal signal when the timing sequence of the serializer is correct.

In this way, the timing sequence correctness of the serializer can be detected only by detecting whether the first result signal is a stable horizontal signal (e.g., a stable high-level signal or a stable low-level signal). Compared with other cases, for example, the first result signal is a signal having a high or low level, as illustrated in the following embodiment, this embodiment can be more convenient to detect the timing sequence correctness of the serializer, which is particularly advantageous in continuously detecting of the timing sequence correctness of the serializer.

Of course, it is not necessary that the first result signal is a stable horizontal signal when the timing sequence of the serializer is correct. In some embodiments, the first result signal is a stable high-level or low-level signal when the timing sequence of the serializer is correct, i.e., it may have high-level and low-level signals at the same time. For example, the parallel data used for detection in the above example is modified from 0101010101 to 0101000101, and similarly, by CK0 and CK180 (when the timing sequence is correct, the first sampled serial data is 00000 and the second sampled serial data is 11011) sampling and XNOR logic operation (when the timing sequence is correct, the first result signal is 00100), the of the timing sequence correctness can be determined based on whether the first result signal has a pulse at a specific data bit (a third data bit) in one cycle or whether the first result signal periodically has a pulse at a specific position (the third data bit in each cycle).

It can be understood that the above embodiment is only exemplary, and it is conceivable to determine the timing sequence correctness of the serializer by the above method of detecting the timing sequence of the serializer based on other forms of parallel data used for detection.

As described above, the method for detecting the timing sequence of the serializer disclosed in at least one embodiment of the present disclosure includes: sampling the serial data output by the serializer to obtain the first sampled serial data and the second sampled serial data which can characterize the timing sequence correctness of the serializer, performing logical operation on the first sampled serial data and the second sampled serial data to obtain the first result signal which can characterize the timing sequence correctness of the serializer, and performing timing sequence detection on the first result signal. Since the parallel data input to the serializer is the parallel data used for detection, the first result signal characterizing the timing sequence correctness of the serializer is also predictable, so the timing sequence detection on the first result signal can be used for determining the timing sequence correctness of the serializer.

Compared with the existing method of detecting the timing sequence correctness of the serializer through external Loopback Test detection, the method of detecting the timing sequence of the serializer according to at least one embodiment of the present disclosure can directly detect the serial data output by the serializer (for example, it may be implemented as a Built-in Self-Test (BIST) circuit) without detecting the data passing through the driver, thus avoiding the use of additional on-chip or off-chip receivers and corresponding software, thereby reducing the complexity of the hardware structure and the design cost.

Other aspects of the method for detecting the timing sequence of the serializer in at least one embodiment of the present disclosure are described in detail below.

As mentioned above, the first result signal will essentially be embodied as a timing sequence. Therefore, in some embodiments, performing timing sequence detection on the first result signal may include performing level detection of the first result signal; or performing edge detection on the first result signal. For example, level detection, edge detection, level detection and edge detection both can be performed on the first result signal. In this way, the first result signal can be accurately acquired by performing level detection and/or edge detection on the first result signal, so that the timing sequence correctness of the serializer can be determined based on the acquired first result signal.

In some embodiments, performing timing sequence detection on the first result signal may include performing level detection on the first result signal to obtain a second result signal; and performing edge detection on the second result signal. That is to say, the timing sequence detection may include level detection on the first result signal and performing edge detection on the second result signal as the result of the level detection. Continuing the above example, when the timing sequence of the serializer is wrong, a value of one or some data bits in the first sampled serial data and the second sampled serial data will suddenly change (e.g., from 0 to 1 or from 1 to 0), and a saltus edge will occur after logical operation, i.e., the second result signal may have a timing sequence saltus (e.g., periodic pulse). Therefore, adding edge detection after level detection can efficiently detect the timing sequence saltus of the second result signal, thus effectively covering cases of timing errors, and improving the practicability of the method for detecting the timing sequence of the serializer.

In some embodiments, performing edge detection on the second result signal may include counting pulses in the second result signal, and performing edge detection on overflow bits of the counted value when the counted value exceeds a threshold value. In some cases, with this embodiment, the edge detection of timing sequence errors of the serializer (e.g., high bits and low bits) can be delayed, so that time for triggering edge detection can be accurately controlled, or stable waiting time that can be used for the second result signal can be formed, for example, to more stably detect the second result signal. In other cases, the timing sequence errors of the serializer may be caused by the environment in which the serializer is located (e.g. electromagnetic environment, etc.) accidentally or randomly, resulting in a certain number of timing sequence errors in the serializer. Therefore, with this embodiment, it is possible to avoid reporting the serializer timing sequence error based on the result of edge detection or determining the serializer as an unqualified serializer, for example, once the serializer timing sequence error occurs, which is especially practical in actual serializer detection. In other cases, depending on the sampling and/or logic operation on parallel data and serial data used for detection, a second result signal that characterizes the timing sequence correctness of the serializer may have a stable number of pulses, which can be set as the threshold of the counter so that the timing sequence error of the serializer can be indicated when the overflow bit based on the counted value of the counter is triggered, i.e., edge detection is triggered.

In some embodiments, level detection and edge detection can be realized by D flip-flops. For example, level detection can be realized by inputting the signal to be detected into the data input terminal of the D flip-flop, and edge detection can be realized by inputting the signal to be detected into the clock control terminal of the D flip-flop.

Specifically, for example, performing the level detection on the first result signal may include inputting the first result signal to a data input terminal of the first D flip-flop. For example, performing the edge detection on the first result signal may include inputting the first result signal to a clock control terminal of the second D flip-flop. For example, performing the edge detection on the second result signal may include inputting the second result signal to the clock control terminal of the second D flip-flop. For example, performing the edge detection on overflow bits of the counted value may include inputting the overflow bits of the counted value into the clock control terminal of the D flip-flop.

Of course, the above-mentioned level detection and edge detection may also be realized by other types of flip-flops, or by other connections to D flip-flops.

In some embodiments, the parallel data used for detection may have data bits of 0 and 1. In this way, the parallel data used for detection can cover the data form of the serializer in the actual parallel-serial conversion process, because in the actual parallel-serial conversion process, the parallel data from all paths are not all 0s or all 1s, and some data bits in these parallel data have values of 0 and other data bits have values of 1, so there is a change between, for example, trigger downloading data 0 and downloading data 1 in the actual parallel-serial conversion process.

In some embodiments, the parallel data used for detection may have data bits with alternating 0 and 1. In this way, the parallel data used for detection can not only cover the data form of the serializer in the actual parallel-serial conversion process, but also make the first result signal simpler, which is convenient to determine the timing sequence correctness of the serializer based on timing sequence detection. For example, referring to the illustrative example described in the embodiment of FIG. 2, the parallel data used for detection is 0101010101, and the timing sequence correctness of the serializer may be determined based on whether the first result signal is all 0s or not.

In some embodiments, sampling the serial data may include sampling the serial data by two-phase clocks with opposite phases (e.g., two-phase clocks CK0/CK180, CK180/CK360, etc.). In this way, for example, the first sampled serial data can correspond to values of odd data bits of serial data, and the second sampled serial data can correspond to values of even data bits of serial data so that each data bit of serial data output by the serializer can be sampled, and the timing sequence correctness of the serializer can be comprehensively determined.

In some embodiments, the logical operation is exclusive OR (XNOR). In this way, the first sampled serial data and the second sampled serial data can be converted into one timing sequence data, and when values of the corresponding data bits of the first sampled serial data and the second sampled serial data are opposite, they can be converted into a value of 0. Therefore, the first result signal can be made simple and it is convenient to determine the timing sequence correctness of the serializer based on the first result signal.

Corresponding to the method for detecting the timing sequence of the serializer provided by at least one embodiment of the present disclosure, the present disclosure also provides a detection circuit for detecting the timing sequence of the serializer.

Figure 3:
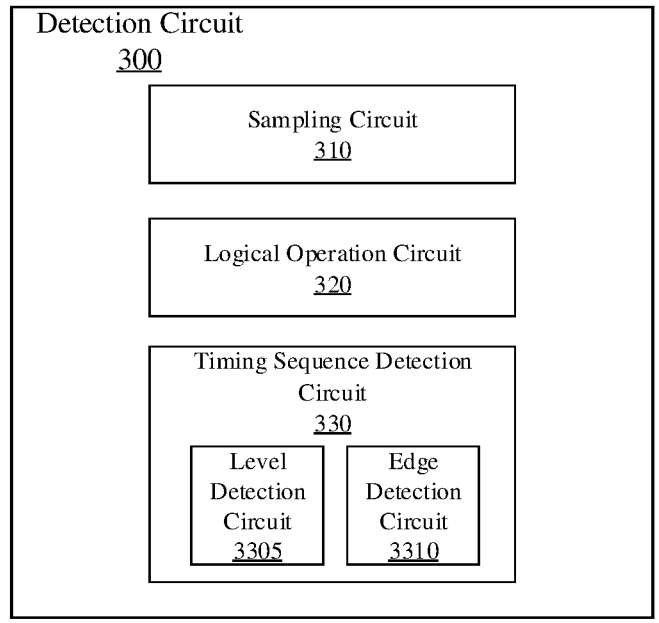
FIG. 3 illustrates a schematic diagram of a detection circuit for detecting the timing sequence of a serializer according to at least one embodiment of the present disclosure.

FIG. 3 illustrates a schematic diagram of a detection circuit for detecting a timing sequence of a serializer according to at least one embodiment of the present disclosure.

Referring to FIG. 3, a detection circuit 300 for detecting the timing sequence of the serializer according to at least one embodiment of the present disclosure includes a sampling circuit 310, a logical operation circuit 320, and a timing sequence detection circuit 330.

The sampling circuit 310 is configured to sample serial data to obtain first sampled serial data and second sampled serial data, wherein the serial data is obtained by parallel-serial conversion of parallel data used for detection by the serializer, and the first sampled serial data and the second sampled serial data respectively include values corresponding to different data bits of the serial data.

The logical operation circuit 320 is configured to perform logical operation on the first sampled serial data and the second sampled serial data to obtain a first result signal.

The timing sequence detection circuit 330 is configured to perform timing sequence detection on the first result signal, wherein the timing sequence detection is used for detecting the timing sequence correctness of the serializer.

As described above, the detection circuit for detecting the timing sequence of the serializer disclosed in at least one embodiment of the present disclosure is implemented in the following process: sampling the serial data output by the serializer to obtain the first sampled serial data and the second sampled serial data which can characterize the timing sequence correctness of the serializer, performing logical operation on the first sampled serial data and the second sampled serial data to obtain the first result signal which can characterize the timing sequence correctness of the serializer, and performing timing sequence detection on the first result signal. Since the parallel data input to the serializer is the parallel data used for detection, the first result signal characterizing the timing sequence correctness of the serializer is also predictable, so the timing sequence detection on the first result signal can be used for determining the timing sequence correctness of the serializer.

Compared with the existing method of detecting the timing sequence correctness of the serializer through external Loopback Test detection, the detection circuit for detecting the timing sequence of the serializer according to at least one embodiment of the present disclosure can directly detect the serial data output by the serializer (for example, it may be implemented as a Built-in Self-Test circuit) without detecting the data passing through the driver, thus avoiding the use of additional on-chip or off-chip receivers and corresponding software, thereby reducing the complexity of the hardware structure and the design cost.

Other aspects of the detection circuit for detecting the timing sequence of the serializer in at least one embodiment of the present disclosure are described in detail below.

In some embodiments, with continued reference to FIG. 3, the timing sequence detection circuit 330 may include a level detection circuit 3305 or an edge detection circuit 3310, wherein the level detection circuit 3305 may be configured to perform level detection on the first result signal and the edge detection circuit 3310 may be configured to perform edge detection on the first result signal.

In some embodiments, with continued reference to FIG. 3, the timing sequence detection circuit 330 may include a level detection circuit 3305 or an edge detection circuit 3310, wherein the level detection circuit 3305 may be configured to perform level detection on the first result signal to obtain a second result signal, and the edge detection circuit 3310 may be configured to perform edge detection on the second result signal.

In some embodiments, the edge detection circuit 3310 may include a counter. The counter is configured to count pulses in the second result signal, and the edge detection circuit 3310 may perform the edge detection on overflow bits of the counted value when the counted value exceeds a threshold value.

In some embodiments, the level detection circuit 3305 may include a first D flip-flop, and the first result signal is input to a data input terminal of the first D flip-flop; and the edge detection circuit includes a second D flip-flop, and the second result signal is input to a clock control terminal of the second D flip-flop.

In some embodiments, the parallel data used for detection may have data bits of 0 and 1.

In some embodiments, the parallel data used for detection may have data bits with alternating 0 and 1.

In some embodiments, the sampling circuit 310 is configured to sample the serial data by two-phase clocks with opposite phases such that the first sampled serial data includes values corresponding to odd data bits of the serial data, and the second sampled serial data includes values corresponding to even data bits of the serial data.

In some embodiments, the logical operation may be exclusive OR (XNOR).

Only a part of the detection circuit 300 for detecting the timing sequence of the serializer according to at least one embodiment of the present disclosure has been described above with reference to FIG. 3, and other respects of the detection circuit 300 for detecting the timing sequence of the serializer can refer to various aspects of the method for detecting the timing sequence of the serializer described with reference to FIG. 2, and effects of various aspects of the method for detecting the timing sequence of the serializer described with reference to FIG. 2 according to the disclosure can also be mapped to the detection circuit 300 for detecting the timing sequence of the serializer described with reference to FIG. 3 of the disclosure, so this will not be described for brevity.

It can be understood that the detection circuit for detecting the timing sequence of the serializer described with reference to FIG. 3 may also be implemented as an electronic device for detecting the timing sequence of the serializer, and the electronic device for detecting the timing sequence of the serializer may also include the circuits shown in FIG. 3, and the circuits shown in FIG. 3 may also be implemented as other software, hardware or the combination of software and hardware for realizing corresponding functions.

An example application scenario in which the method or the detection circuit for detecting the timing sequence of the serializer provided according to at least one embodiment of the present disclosure can be utilized is described below with reference to FIG. 4. It can be understood that the scenario shown in FIG. 4 is only an example, and does not exhaustively list all aspects of the method or detection circuit for detecting the timing sequence of the serializer, and the aspects described with reference to FIG. 4 and the aspects described with reference to FIG. 2 and FIG. 3 can be mutually referenced without exceeding the scope of this disclosure.

Figure 4:
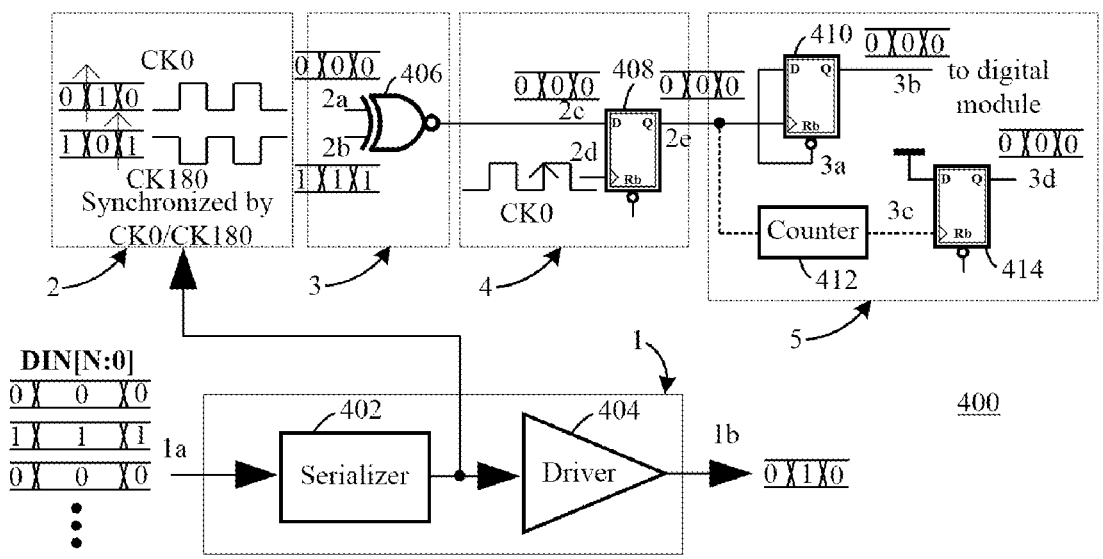
FIG. 4 illustrates a schematic diagram of an example application scenario according to at least one embodiment of the present disclosure.

FIG. 4 illustrates a schematic diagram of an example application scenario 400 according to at least one embodiment of the present disclosure. In the example application scenario 400, the timing sequence correctness of a serializer, for example, a serializer included in a transmitter, is detected by using some embodiments of the method for detecting the timing sequence of the serializer and the detection circuit for detecting the timing sequence of the serializer as described above with reference to FIG. 2 and FIG. 3.

Referring to FIG. 4, circuit 1 represents a channel of a transmitter, and its main circuits include a serializer (SER) 402 and a driver (DRV) 404. The serializer 402 has the function of converting parallel low-speed data into serial high-speed data, so it is a core component of the transmitter to realize parallel-serial conversion. The input and output of the serializer 402 are digital signals, and the driver 404 converts the high-speed digital signal output by the serializer 402 into a high-speed low-voltage analog differential signal (shown as 1b in the figure), and then sends it to the receiver via a transmission medium.

As mentioned above, the timing sequence function of the traditional high-speed serializer is mostly detected by external Loopback Test detection. This detection method requires an additional receiving circuit to decode the received high-speed low-voltage analog differential signal and then compare it with original transmit data, and judge whether the timing sequence function of the serializer is correct according to a result of the comparison. This detection method has the disadvantages of complicated hardware structure and high design cost.

In this example application scenario 400, the timing sequence correctness of the serializer included in the transmitter can be detected by the method of detecting the timing sequence of the serializer as described above with reference to FIG. 2 and FIG. 3 or the detection circuit (e.g., constructed as a Built-in Self-Test circuit in this example application scenario 400).

The principle of detecting the timing sequence of the serializer included in the transmitter by the Built-in Self-Test circuit is described in detail below.

Referring to FIG. 4, the serializer 402 receives parallel data used for detection, i.e., data 1a, which is N-path parallel data DIN[N:0]. There may be data bits with alternating 0 and 1 between each path of parallel data (for example, 1 indicates a high level and 0 indicates a low level), i.e., the parallel data used for detection is set to 0101 . . . or 1010 . . . . As shown in FIG. 4, the parallel data DIN[N:0] is set to 0101 . . . . The serializer 402 may output corresponding serial data, such as 0101 . . . , based on the parallel data DIN[N:0].

Subsequently, the serial data output by the serializer 402 is sampled by the sampling circuit 2 (which may correspond to the sampling circuit 310 described with reference to FIG. 3) by different phase clocks, respectively. For example, the two-phase clock CK0/CK180 generated by an on-chip phase-locked loop can respectively sample the serial data output by the serializer to obtain two sampled serial data 2a and 2b. As shown in FIG. 4, CK0/CK180 are clock signals with opposite phases, and the serial data output by the serializer can be sampled in the sampling circuit 2 based on this CK0/CK180. The sampling process will be described in detail with reference to FIG. 5.

Figure 5:
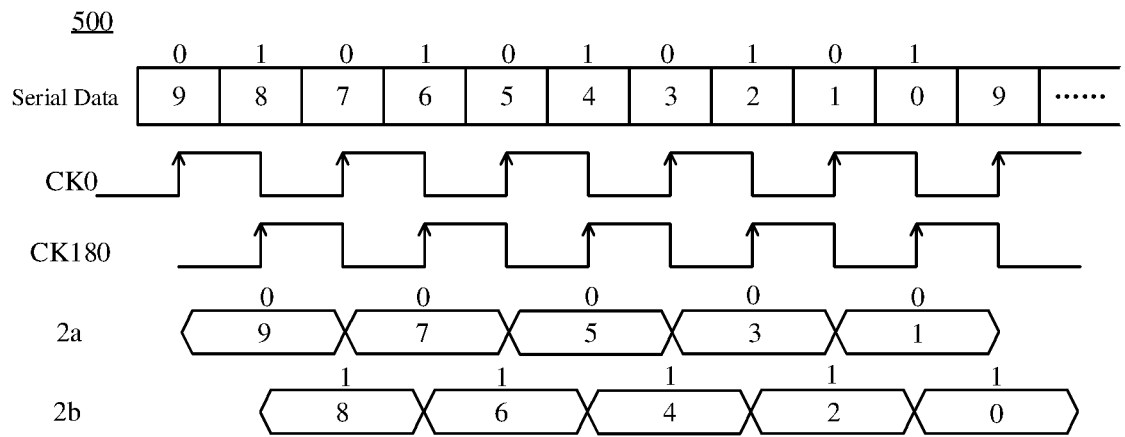
FIG. 5 illustrates a schematic diagram of sampling serial data respectively by different phase clocks according to at least one embodiment of the present disclosure.

FIG. 5 illustrates a schematic diagram 500 of sampling serial data respectively by different phase clocks according to at least one embodiment of the present disclosure.

Referring to FIG. 5, serial data can be sampled by a two-phase clock CK0/CK180 combined with, for example, a D flip-flop. In the example application scenario 400, the parallel data used for detection are data bits with alternating 0 and 1. Therefore, in the schematic diagram 500, a piece of serial data output by the serializer can be assumed as serial data with a bit length of 10 (including serial data numbered 9 to 0 as shown in FIG. 5), and each data bit has a corresponding value of 0 and 1.

For different clocks CK0/CK180, the serial data can be sampled based on the sampling principle of a D flip-flop, respectively. When a rising edge of CK0 comes, the data of a D terminal (a data input terminal) of the D flip-flop can be transferred to a Q terminal (a data output terminal), so values of odd data bits (data bits numbered 9, 7, 5, 3, and 1 as shown in FIG. 5) of serial data can be sampled, thereby obtaining sampled serial data 2a. In this example application scenario, the values of odd data bits of serial data are all 0s, so the sampled serial data 2a is all 0s. Similarly, when the rising edge of CK180 comes, the data of the D terminal (the data input terminal) of the D flip-flop can be transferred to the Q terminal (the data output terminal), so values of even data bits (data bits numbered 8, 6, 4, 2, 0 as shown in FIG. 5) of serial data can be sampled, thereby obtaining sampled serial data 2b. In this example application scenario, the values of even data bits of serial data are all 1s, so the sampled serial data 2b is all 1s.

It can be understood that FIG. 5 only illustrates an exemplary implementation of sampling the serial data, and the serial data may also be sampled in other ways.

Returning to FIG. 4, after obtaining the sampled serial data 2a and 2b, logical operation can be performed on the sampled serial data 2a and 2b in the logical operation circuit 3 (which may correspond to the logical operation circuit described with reference to FIG. 3) shown in FIG. 4, so that a result 2c (for example, corresponding to the first result signal described above) of the logic operation can be obtained. The logical operation circuit 3 in FIG. 4 is embodied as an XNOR gate 406, so it can perform an XNOR logical operation on the sampled serial data 2a and 2b. Of course, other logical operations may also be performed on the sampled serial data 2a and 2b.

After result 2c of the logical operation is obtained, the level detection can be performed on the result 2c of the logical operation in the level detection circuit 4 (which may be included in the timing sequence detection circuit 330 described with reference to FIG. 3). For example, as shown in FIG. 4, the result 2c of the logical operation can be input to the input terminal of the D flip-flop 408, and the data of the D terminal of the D flip-flop can be transferred to the Q terminal by, for example, the rising edge of the clock CK0, so as to obtain a result 2e of the level detection (for example, corresponding to the second result signal described above). After the result 2e of the level detection is obtained, the timing sequence correctness of the serializer 402 can be determined based on the result 2e of the level detection. In this example application scenario, a stable low level 0 of result 2e of the level detection indicates that the timing sequence of the serializer 402 is correct, and a stable high level 1 of result 2e of the level detection indicates that the timing sequence of the serializer 402 is wrong.

The result 2e of the level detection can also be used as a control signal of the edge detection circuit 5 (which may be included in the timing sequence detection circuit 330 described with reference to FIG. 3) to realize edge detection on the result 2e of the level detection. For example, as shown in FIG. 4, the edge detection can be performed directly on the result 2e of the level detection, i.e., the result 2e of the edge detection can be input to the clock control terminal of the D flip-flop 410, so as to obtain the result 3b of the edge detection. The D flip-flop 410 here is, for example, an RSTB-delayed high-level D flip-flop, which can perform edge detection on the result 2e of the level detection after a certain waiting time ($T_{RSTB}$ for data stabilization). In this example application scenario, when the timing sequence of the serializer is correct, the output 3b is a low level 0. When the timing sequence of the serializer is wrong (for example, a clock delay in extreme process angle and a holding time margin of the flip-flop is not enough), then 2e will no longer keep the stable low level 0, and a saltus signal will occur, so the subsequent flip-flop will be triggered to pull 3b high to high level 1.

Referring to FIG. 4, lines connected by dotted lines in the edge detection circuit 5 (including the counter 412 and the D flip-flop 414) show an alternative embodiment of directly performing edge detection on the result 2e of the level detection. Compared with directly inputting the result 2e of the level detection to the clock control terminal of the D flip-flop 410, in this alternative embodiment, the result 2e of the level detection is input to the counter 412 to drive the counter to count the pulses of the result 2e of the level detection, and the output of the counter is connected to a clock control terminal of the D flip-flop 414 to trigger the D flip-flop 414 for edge detection after the count of the counter 412 exceeds a count threshold. In this way, in the example application scenario, for example, the timing sequence error of the high bit and the low bit of the serializer 402 will generate periodic error pulses with a stable duty ratio. The purpose of the counter is to count fixed pulses and then, the D flip-flop 414 is triggered by the overflow bits 3c. A setting of the waiting time may be replaced by the counter.

With the above level detection and edge detection, the timing sequence correctness of the serializer 402 can be reflected in result 2e of level detection and the result 3b (or 3d) of edge detection. When the timing sequence of the serializer 402 is correct, the 2e output is a stable low level of 0. When the timing sequence of the serializer 402 is wrong, 2e will be changed into a signal with a periodic pulse or an aperiodic signal with abrupt level change, both of which will trigger the clock control terminal of the D flip-flop in the edge detection circuit 5 (for example, RSTB is used as a reset signal of the D flip-flop, and may also be used as the data terminal, and its initial low level 0 indicates the reset state of the D flip-flop, while its delayed time being high level indicates the detection state of the D flip-flop), so that the final output will change from 0 to 1, which means that the edge detection is abnormal.

Table 1 illustrates an example table of the results (result 2e of the level detection and result 3b of the edge detection) and judgment criteria of the serializer timing sequence detection in the example application scenario.

TABLE 1

Results and Criteria of Serializer Timing sequence Detection

| Correctness | Level Detection | Edge Detection | Criterion |
|---|---|---|---|
| Correct | 0 | 0 | 2e and 3b = 0 |
| Error | Saltus (such as periodic short pulse) | 1 | 2e or 3b = 1 |
| Error | 1 | 0 | |

In the example application scenario, the timing sequence correctness of the serializer can be determined based on the result of the timing sequence detection of the serializer with reference to Table 1. The determination of the timing sequence correctness of the serializer based on the result of the timing sequence detection of the serializer may be implemented by machine or manually. For example, the results of serializer timing sequence detection (the result 2e of level detection and the result 3b (or 3d) of edge detection) can be output to an oscilloscope, and for example, the tester can determine the timing sequence correctness of the serializer according to the high and low levels displayed by the oscilloscope. For another example, the result of the timing sequence detection may be obtained by a digital circuit (for example, from one or more registers storing the result 2e of the level detection and the result 3b (or 3d) of the edge detection) and the above determination process may be performed by the digital circuit.

In this example application scenario, the detection of the timing sequence correctness of the serializer included in the transmitter can be realized. Compared with the existing method of detecting the timing sequence correctness of the serializer through external Loopback Test detection, the Built-in Self-Test circuit can be used for detecting the timing sequence correctness of the serializer, which reduces the complexity of hardware structure and design cost. In addition, two kinds of error detection methods, level detection and edge detection, are designed to effectively cover cases of timing errors. In addition, the Built-in Self-Test circuit has a simple structure, and can be used as an effective supplement to Loopback Test detection, for example, it may be applied to a Circuit Probing (CP) stage/Final Test (FT) stage, thus reducing the probability that the failed integrated chips (IC) go to the client.

In addition, the timing sequence function of the serializer can be detected by the above Built-in Self-Test circuit under the condition of increasing the clock signal of the serializer to increase the speed rate of the parallel-serial conversion of the serializer. In this way, the above Built-in Self-Test circuit can detect a maximum data transmission rate that the serializer can support.

In the above example application scenario, the timing sequence correctness of the serializer is detected by setting exemplary parallel data, sampling circuit, logical operation circuit and timing sequence detection circuit (level detection circuit and/or edge detection circuit) for detection. However, it can be understood that the above example application scenarios are non-limiting examples for readers to understand the present disclosure, and various aspects of the above example application scenarios may be appropriately modified without exceeding the scope of the present disclosure. For example, the parallel data, sampling circuit, logical operation circuit, timing sequence detection circuit (including level detection circuit and/or edge detection circuit) and criteria used for detection may be modified. For example, level detection and/or edge detection can be performed on the result 2c of the logical operation output by the logical operation circuit 3. Therefore, the logical operation circuit 3 may be connected to one of the level detection circuit 4 and the edge detection circuit 5, or connected to the level detection circuit 4 and the edge detection circuit 5, respectively, and the criteria may be modified adaptively. In addition, the circuits in the above example application scenarios may be combined or separated, or some circuits may be deleted. For example, the sampling circuit 2, the logical operation circuit 3, the level detection circuit 4 and/or the edge detection circuit 5 may be combined into one circuit.

Figure 6:
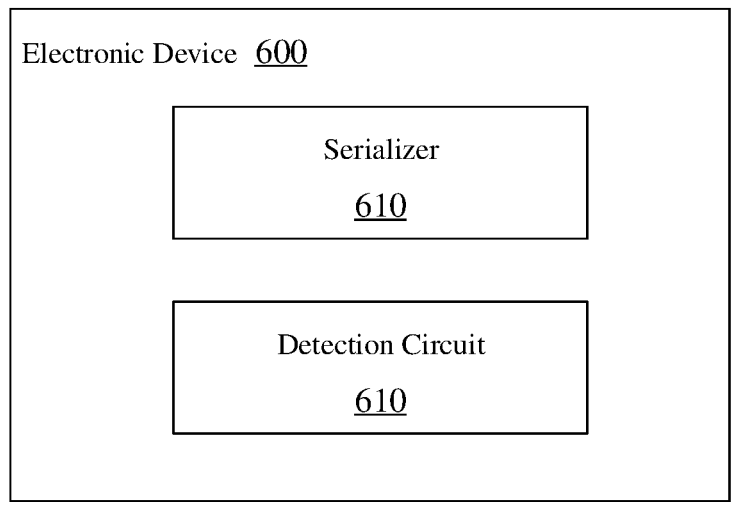
FIG. 6 illustrates a schematic diagram of an electronic device for detecting the timing sequence of a serializer according to at least one embodiment of the present disclosure.

FIG. 6 illustrates a schematic diagram of an electronic device 600 for detecting the timing sequence of a serializer according to at least one embodiment of the present disclosure. As shown in FIG. 6, the electronic device 600 for detecting the timing sequence of the serializer includes a serializer 610 and a detection circuit 620 for detecting the timing sequence of the serializer.

The serializer 610 may be any type of serializer that realizes serial-parallel conversion of data. Therefore, the electronic device 600 for detecting the timing sequence of the serializer may be an electronic device including any serializer. For example, the electronic device 600 for detecting the timing sequence of the serializer may include serial ATA (Serial ATA), RDRAM memory, and the like.

The detection circuit 620 for detecting the timing sequence of the serializer is the same as the detection circuit 300 that detects the timing sequence of the serializer described with reference to FIG. 3. Therefore, the effects of various aspects of the detection circuit for detecting the timing sequence of the serializer described with reference to FIG. 3 according to the present disclosure can also be mapped to the detection circuit 620 for detecting the timing sequence of the serializer described with reference to FIG. 6, which is not described here.

The detection circuit 620 for detecting the timing sequence of the serializer may be implemented as a Built-in Self-Test circuit, so the electronic device 600 for detecting the timing sequence of the serializer can be integrated on a chip, and can be applied to various data conversion devices, especially the data conversion devices that need to realize the parallel-serial conversion function of data, so as to realize the parallel-serial conversion function of data and the timing sequence detection of the serializer.

It should be noted that in this text, relational terms such as first, second, etc. are only used for distinguishing one entity or operation from another entity or operation, and do not necessarily require or imply any such actual relationship or sequence between these entities or operations. Moreover, the term "including", "comprising", "containing" or any other variation thereof is intended to cover non-exclusive inclusion, so that a process, method, article or device that includes a series of elements not only includes those elements, but also includes other elements not explicitly listed, or further includes elements inherent to such a process, method, article or device. Without further restrictions, the element defined by the statement "including" does not exclude the existence of another identical element in the process, method, article or device that includes the element.

The above are only the preferred embodiments of the present disclosure, and are not intended to limit the present disclosure. For those skilled in the art, the present disclosure may be modified and changed.

What is claimed is:

1. A method for detecting a timing sequence of a serializer, comprising:
    sampling serial data to obtain first sampled serial data and second sampled serial data, wherein the serial data is obtained by parallel-serial conversion of parallel data used for detection by the serializer, and the first sampled serial data and the second sampled serial data respectively include values corresponding to different data bits of the serial data;
    performing logical operation on the first sampled serial data and the second sampled serial data to obtain a first result signal; and
    performing timing sequence detection on the first result signal to determine whether the first result signal is consistent with a prediction signal, wherein when the first result signal is consistent with the predetermined signal, the timing of the serializer is correct.

2. The method according to claim 1, wherein performing the timing sequence detection on the first result signal comprises:
    performing level detection on the first result signal; or
    performing edge detection on the first result signal.

3. The method according to claim 1, wherein performing the timing sequence detection on the first result signal comprises:
    performing level detection on the first result signal to obtain a second result signal; and
    performing edge detection on the second result signal.

4. The method according to claim 3, wherein performing the edge detection on the second result signal further comprises:
    counting pulses in the second result signal, and performing the edge detection on one or more overflow bits of the counted value when the counted value exceeds a threshold value.

5. The method according to claim 3, wherein,
    performing the level detection on the first result signal comprises inputting the first result signal into a data input terminal of a first D flip-flop; and
    performing the edge detection on the second result signal includes inputting the second result signal into a clock control terminal of a second D flip-flop.

6. The method according to claim 1, wherein the parallel data used for detection has data bits with alternating 0 and 1.

7. The method of claim 1, wherein sampling the serial data comprises:
    sampling the serial data by two-phase clocks with opposite phases such that the first sampled serial data includes values corresponding to odd data bits of the serial data, and the second sampled serial data includes values corresponding to even data bits of the serial data.

8. A detection circuit for detecting a timing sequence of a serializer, comprising:
    a sampling circuit, configured to sample serial data to obtain first sampled serial data and second sampled serial data, wherein the serial data is obtained by parallel-serial conversion of parallel data used for detection by the serializer, and the first sampled serial data and the second sampled serial data respectively include values corresponding to different data bits of the serial data;
    a logical operation circuit, configured to perform logical operation on the first sampled serial data and the second sampled serial data to obtain a first result signal; and
    a timing sequence detection circuit, configured to perform timing sequence detection on the first result signal to determine whether the first result signal is consistent with a prediction signal, wherein when the first result signal is consistent with the predetermined signal, the timing of the serializer is correct.

9. The detection circuit according to claim 8, wherein the timing sequence detection circuit comprises:
    a level detection circuit, configured to perform level detection on the first result signal; or an edge detection circuit, configured to perform edge detection on the first result signal.

10. The detection circuit according to claim 8, wherein the timing sequence detection circuit comprises:
a level detection circuit, configured to perform level detection on the first result signal to obtain a second result signal; and
an edge detection circuit, configured to perform edge detection on the second result signal.

11. The detection circuit according to claim 10, wherein the edge detection circuit comprises:
a counter, configured to count pulses in the second result signal, and perform edge detection on one or more overflow bits of the counted value when the counted value exceeds a threshold value.

12. The detection circuit according to claim 10, wherein,
the level detection circuit includes a first D flip-flop, and the first result signal is input to a data input terminal of the first D flip-flop; and
the edge detection circuit includes a second D flip-flop, and the second result signal is input to a clock control terminal of the second D flip-flop.

13. The detection circuit according to claim 8, wherein the parallel data used for detection has data bits with alternating 0 and 1.

14. The detection circuit according to claim 8, wherein the sampling circuit is configured to sample the serial data by two-phase clocks with opposite phases such that the first sampled serial data includes values corresponding to odd data bits of the serial data, and the second sampled serial data includes values corresponding to even data bits of the serial data.

15. An electronic device, comprising:
a detection circuit for detecting a timing sequence of a serializer, comprising:
a sampling circuit, configured to sample serial data to obtain first sampled serial data and second sampled serial data, wherein the serial data is obtained by parallel-serial conversion of parallel data used for detection by the serializer, and the first sampled serial data and the second sampled serial data respectively include values corresponding to different data bits of the serial data;
a logical operation circuit, configured to perform logical operation on the first sampled serial data and the second sampled serial data to obtain a first result signal; and
a timing sequence detection circuit, configured to perform timing sequence detection on the first result signal to determine whether the first result signal is consistent with a prediction signal, wherein when the first result signal is consistent with the predetermined signal, the timing of the serializer is correct; and
the serializer.

* * * * *